United States Patent

[11] 3,618,984

| [72] | Inventors | Charles F. Cook<br>Decatur;<br>Lawrence F. Schexnayder, Joliet; James W. Thais, Decatur, all of Ill. |
|---|---|---|
| [21] | Appl. No. | 845,322 |
| [22] | Filed | July 28, 1969 |
| [45] | Patented | Nov. 9, 1971 |
| [73] | Assignee | Caterpillar Tractor Co.<br>Peoria, Ill. |

[54] PILOT SELECTOR VALVE FOR SIMULTANEOUSLY CONTROLLING SEPARATE FLUID CIRCUITS
2 Claims, 1 Drawing Fig.

[52] U.S. Cl. .................................................. 280/481,
60/52 HE, 91/413, 91/461, 137/596.12,
137/624.27, 137/625.6, 137/625.68, 280/489
[51] Int. Cl. .................................................. B60d 1/00
[50] Field of Search .......................................... 280/481,
489; 172/300, 301, 302; 91/413, 461; 60/52 HE;
137/596.12, 596.15, 624.27, 625.6, 625.68

[56] References Cited
UNITED STATES PATENTS

| 2,928,482 | 3/1960 | Gillette | 60/52 HE X |
| 2,946,144 | 7/1960 | Anderson | 60/52 HE X |
| 2,985,147 | 5/1961 | Rockwell | 137/624.27 |
| 3,015,344 | 1/1962 | Hausmann et al. | 91/413 X |
| 3,048,981 | 8/1962 | Mark et al. | 60/52 HE X |
| 3,050,037 | 8/1962 | Heckenkamp | 137/596.12 X |
| 3,283,773 | 11/1966 | Lowman | 137/596.12 X |
| 3,304,841 | 2/1967 | Nevulis | 137/596.12 X |
| 3,311,389 | 3/1967 | Barton et al. | 280/489 |
| 3,469,861 | 9/1969 | Schexnayder | 280/481 X |
| 3,511,276 | 5/1970 | Jessen et al. | 137/624.27 |

*Primary Examiner*—Benjamin Hersh
*Assistant Examiner*—Leslie J. Paperner
*Attorney*—Fryer, Tjensvold, Feix, Phillips & Lempio

ABSTRACT: A pilot selector valve comprises a three-position spool reciprocally mounted therein for selectively communicating pressurized fluid to separate circuits, each adapted to actuate a vehicle attachment. The vehicle attachments may comprise a cushion hitch assembly and a push-pull coupling each mounted on a wheel tractor scraper. The pilot selector valve may be positioned to either (1) render the cushion hitch assembly operative and unlatch the coupling, (2) render the cushion hitch assembly inoperative and retain the coupling in an unlatched position, or (3) retain the cushion hitch assembly in an inoperative condition and actuate the coupling to a latched position.

PATENTED NOV 9 1971
3,618,984
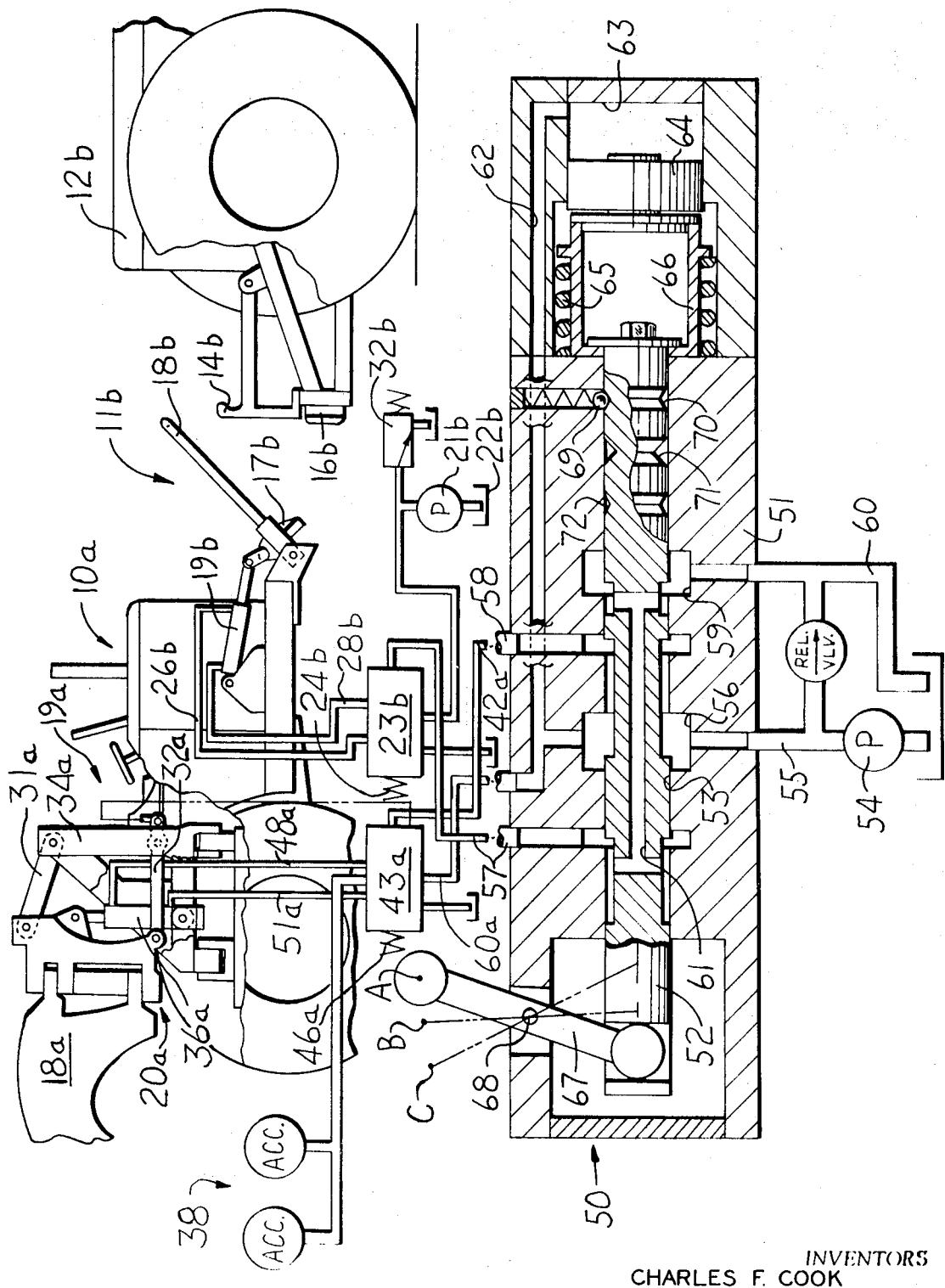
INVENTORS
CHARLES F. COOK
LAWRENCE F. SCHEXNAYDER
JAMES W. THAIS
BY
Fryer, Tjensvold, Feix, Phillips & Lempio
ATTORNEYS

PILOT SELECTOR VALVE FOR SIMULTANEOUSLY CONTROLLING SEPARATE FLUID CIRCUITS

Modern day earth-moving equipment normally require a number of attachments mounted thereon for performing various work functions. For example, a wheel tractor scraper may comprise a cushion hitch assembly operatively connected between the tractor and scraper to dampen pitch and bounce occurring therebetween during operation. In addition, the tractor may have a push-pull coupling mounted on the front end thereof adapted to mechanically attach the tractor to a second tractor or the like.

An independent control circuit is normally provided for the selective actuation of each attachment. Such conventional systems oftentimes increase the number and complexity of hydraulic components employed in the separate control circuits. In view of cost, space, service and related considerations, it would be desirable to provide means for simultaneously controlling the actuation of the separate vehicle attachments during selected phases of vehicle operation.

An object of this invention is to overcome the above, briefly described problems by providing an economical and noncomplex multiposition pilot selector valve for simultaneously controlling at least two fluid circuits. Each circuit is adapted to actuate a separate vehicle attachment via a control valve to perform separate work functions. The selector valve may be manually activated to assume at least three positions for selectively communicating a pressurized fluid source to at least one of the control valves employed in the two fluid circuits.

Other objects of this invention will become apparent from the following description and accompanying drawing which schematically illustrates a pilot selector valve embodiment 50 of this invention. The selector valve is shown as operatively connected to separate fluid circuits for selectively actuating a cushion hitch assembly and/or push-pull coupling, each mounted on a wheel tractor scraper.

It should be understood that the pilot selector valve is adapted for the control of vehicle attachments other than the ones illustrated. The pilot selector valve comprises a multipart housing 51 having a spool 52 reciprocally mounted in a bore 53 thereof. A pressurized fluid source comprising a pump 54, which may be driven by the vehicle's engine in a conventional manner, communicates such fluid to the valve via a conduit 55.

The conduit communicates with an annulus 56 formed in the housing and adapted to communicate with a first or second outlet conduit 57 or 58, respectively. A second annulus 59 is formed in the housing to constantly communicate with a return conduit 60. A passage means 61 is formed in the spool to communicate at each end thereof with an annular groove defined on the spool by suitably spaced lands.

A passage means 62 is formed in the housing to communicate the pressurized fluid source via annulus 56 with a chamber 63. Fluid pressure in the chamber will normally urge a piston 64, reciprocally mounted therein, leftwardly against the opposed biasing force of a coil spring 65. When the fluid pressure in the chamber falls below a predetermined level, the spring will urge the spool rightwardly via an attached cup-shaped retainer 66 to automatically recenter the spool.

A handle 67 is pivotally mounted on the housing by a pin 68 to be selectively moved to one of the three illustrated positions "A," "B" or "C". In the "A" position illustrated, a spring-loaded detent means or ball 69 will engage a circular groove 70 to lock the spool in such position. Movement of the handle to the "B" or "C" position will function to reengage the detent ball in a groove 71 or 72, respectively. It should be noted that grooves 70 and 72 are preferably shallower than groove 71 to provide "soft" detent actions thereat permitting the operator to sense by hand when the spool is released from its various positions.

Conduits 57 and 58 are arranged to selectively communicate pressurized fluid to main control valves 23b and 43a of a push-pull coupling 11b and cushion hitch assembly 19a circuits, respectively. The cushion hitch assembly and control circuit therefor may be of the conventional type fully described in U.S. Pat. No. 3,311,389, issued on Mar. 28, 1967 to James C. Barton et al. for "System for Control of Pitch and Bounce in Tractor-Trailer Combinations."

Numerals identical to those appearing in such patent depict corresponding structures with the numerals appearing in the drawing of this application being accompanied by an *a*. The cushion hitch assembly essentially comprises a pivot assembly 20a operatively connecting a tractor 10a to a gooseneck 18a extending forwardly of a scraper (not shown). A pair of pivoted links 31a and 32a attach the pivot assembly to an A-frame 34a.

Conduits 48a and 51a operatively connect control valve 43a with the rod and head ends of a cylinder 36a respectively, pivotally mounted between the A-frame and pivot assembly 20a. In the "A" position illustrated, pilot selector valve 50 will communicate pressurized fluid from pump 54 to control valve 43a via conduits 58 and 42a to move a spool of a lockout valve thereof (not shown) against the closing force of a biasing spring 46a. Thus, the head and rod ends of cylinder 36a will be suitably pressurized via conduit 60a by the pressurized fluid source comprising pump 54 to dampen relative movements occurring between the tractor and scraper during vehicle operation.

Push-pull coupling 11b and its control circuit are more fully described in U.S. Pat. Application Ser. No. 685,155, filed on Nov. 22, 1967 by Lawrence F. Schexnayder for "Hydraulic Control Circuit For Push-Pull Coupling of Tandem Machines," now U.S. Pat. No. 3,469,861. The latter application, as well as the aforementioned patent, are each assigned to the assignee of this application. It should be noted that numerals appearing in the drawing herein and accompanied by a *b*, depict corresponding and like-numbered structures disclosed in the above-mentioned application.

Main control valve 23b for the push-pull coupling circuit is operatively connected to the rod and head ends of a cylinder 19b by conduits 26b and 28b, respectively. The cylinder rod is mechanically connected to a pivoted bail 18b adapted to latch onto a hook 14b secured to the rear end of a second tractor 12b. A push pad 16b is also mounted thereon to be aligned with a push block 17b mounted on tractor 10b.

As stated above, when pilot selector valve 50 is maintained in the illustrated "A" position, pressurized fluid from pump 54 is communicated to control valve 43a to activate the cushion hitch circuit. Simultaneously therewith, communication of pressurized fluid to conduit 57 is blocked and the conduit communicates with the reservoir of the pressurized fluid source via passage 61 and return conduit 60. Thus, a spring 24b will maintain control valve 23b of the push-pull coupling circuit in a position whereby a pump 21b communicates pressurized fluid to the rod end of cylinder 19b via conduit 26b and the head end thereof is relieved via conduit 28b to maintain the bail in its raised and unlatched position.

Movement of handle 67 to the "B" position will not affect the push-pull coupling circuit, but will change the mode of operation of the cushion hitch assembly circuit. In particular, conduit 58 will now communicate with drain to relieve fluid pressure at the right end of control valve 43a. Thus spring 46a will function to move the spool rightwardly to communicate conduit 51a and the head end of cylinder 36a with drain.

Simultaneously therewith, pump 54 will communicate pressurized fluid to conduit 48a and the rod end of the cylinder whereas the head end of the cylinder will be relieved via conduit 51a. The cushion hitch circuit will consequently "bottom-out" whereby the hitch will lower until it hits an adjacent stop. Thus when the bowl is being loaded, for example, "bouncing" and related adverse movements will be prevented to ensure against damage to the machine.

When handle 78 is moved to the "C" position, the function of the cushion hitch assembly will remain the same, i.e., it will remain "bottomed-out". However, pump 54 now communicates pressurized fluid to conduit 57 and thus to control valve 23b of the push-pull circuit. The spool thereof (not shown) will move leftwardly against the opposing force of a spring 24b to pressurize the head end of cylinder 19b via conduit 28b and to exhaust the rod end thereof via conduit 26b. Thus a bail 18b will be latched over a hook 14b for tandem operation of two scrapers, for example. Should pump 54 cease operating, for example, spring 65 will automatically return spool 52 to the "B" position of operation.

It should be understood that the pilot selector valve could be suitably modified to provide a fourth position. Such position would contemplate the simultaneous communication of pressurized fluid from pump 54 to both conduits 57 and 58. However, such fourth position is preferably not employed in the illustrated embodiment. In particular, it is desired to inactivate the cushion hitch assembly to protect links 31a and 32a and attendant hardware when the push-pull coupling is actuated to a latched position during the pull phase of the loading cycle.

We claim:

1. A vehicle having at least two attachments mounted thereon, each of said attachments having a separate work function, a fluid circuit means, including a control valve, for actuating each of said attachments, and a multiposition pilot selector valve means operatively connected to each of said control valves for selectively communicating a pressurized fluid source to at least one of said control valves for selectively actuating at least one of said attachments, said pilot selector valve means including a spool reciprocally mounted therein and detent means operatively associated with said spool for locking said spool in at least three different positions, manual means for moving said spool to a first position communicating said pressurized fluid source with a first control valve and for simultaneously preventing said pressurized fluid source from communicating with a second control valve; a second position for preventing said pressurized fluid source from communicating with said first and second control valves; and a third position preventing said pressurized fluid source from communicating with said first control valve and for communicating said pressurized fluid source with said second control valve, passage means formed in said pilot selector valve means for venting fluid from a control valve when it is not placed in communication with said pressurized fluid source, and means, including a chamber within said selector valve communicating with said pressurized fluid source, for returning said pilot selector valve to a predetermined position when the fluid pressure in said chamber falls below a predetermined level.

2. The invention of claim 1, wherein one of said attachments comprises a cushion hitch assembly operatively connected between a tractor and a scraper and a second attachment comprises a push-pull coupling mounted on said tractor.

* * * * *